(12) United States Patent
Leppens et al.

(10) Patent No.: US 11,781,026 B2
(45) Date of Patent: Oct. 10, 2023

(54) AQUEOUS INK COMPOSITION

(71) Applicant: Canon Production Printing Holding B.V., Venlo (NL)

(72) Inventors: Marcel A. P. W. E. Leppens, Venlo (NL); Roy W. N. Evers, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 130 days.

(21) Appl. No.: 17/504,325

(22) Filed: Oct. 18, 2021

(65) Prior Publication Data

US 2022/0135815 A1    May 5, 2022

(30) Foreign Application Priority Data

Oct. 30, 2020  (EP) .................................. 20204964

(51) Int. Cl.
*C09D 11/037* (2014.01)
*B41M 5/00* (2006.01)
(Continued)

(52) U.S. Cl.
CPC ............... *C09D 11/037* (2013.01); *B41J 2/01* (2013.01); *B41J 2/2107* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312;
(Continued)

(56) References Cited

U.S. PATENT DOCUMENTS

2006/0270756 A1   11/2006  Hanmura et al.
2009/0246488 A1*  10/2009  Yanagi ................. B41M 5/0023
                                                              427/256
(Continued)

FOREIGN PATENT DOCUMENTS

JP     2007-145924 A      6/2007
WO    WO 2018/143957 A1   8/2018

OTHER PUBLICATIONS

European Search Report issued in Application No. EP 20 20 4964 dated Apr. 26, 2021.

*Primary Examiner* — Manish S Shah
(74) *Attorney, Agent, or Firm* — Birch, Stewart, Kolasch & Birch, LLP (57) ABSTRACT

An aqueous ink composition includes a film-forming retardation additive, which enhances the pigment efficiency in the ink composition. A method for making such an ink and a method of printing with such an ink are also disclosed.

14 Claims, 2 Drawing Sheets

(51) Int. Cl.
*C09D 11/033* (2014.01)
*C09D 11/106* (2014.01)
*C09D 11/322* (2014.01)
*B41J 2/21* (2006.01)
*B41J 2/01* (2006.01)

(52) U.S. Cl.
CPC ......... *B41M 5/0023* (2013.01); *C09D 11/033* (2013.01); *C09D 11/106* (2013.01); *C09D 11/322* (2013.01)

(58) Field of Classification Search
CPC .............. B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2010/0076134 A1* | 3/2010 | Yoshida | C09D 11/322 524/270 |
| 2015/0105504 A1 | 4/2015 | Verheggen et al. | |
| 2016/0229177 A1* | 8/2016 | Yamamoto | B41J 2/01 |
| 2016/0318299 A1* | 11/2016 | Arai | B41J 2/01 |
| 2016/0319145 A1* | 11/2016 | Arai | C09D 11/30 |

* cited by examiner

AQUEOUS INK COMPOSITION

FIELD OF THE INVENTION

The present invention relates to an aqueous ink composition comprising dispersed pigment particles and dispersed polymer particles.

BACKGROUND ART

Such ink compositions, also termed latex ink compositions, are generally known in the art.

An important feature in ink design is color strength, or tinctorial value of pigments, which is defined as the ability of a (colored) pigment to impart color to other materials, such as (white) paper. The lower the concentration of a colored pigment is required to achieve a predefined impression of color that is a given depth of a shade, the better the color strength of colored pigments is.

During designing new latex ink compositions for new printing applications, inventors found that after testing, the final chroma and lightness (in accordance with standardized CIELAB color space L*C*h (Lightness, Chroma and hue) were disappointing considered the (relative) amount of pigment that was used in the ink compositions.

For the purpose of their research and for the present disclosure, inventors defined pigment efficiency as a parameter:

Pigment efficiency (-)=1/(Pigment concentration@color strength target (g pigment/g ink)=mass amount of ink (g)/mass amount of pigment@color strength target (g).

The color strength target is dependent on ink color and media (print substrate) type.

Color strength is predominantly determined by a combination of lightness (L) and chroma (C) in accordance with standardized CIELAB color space L*C*h (Lightness, Chroma and hue). For black inks, the color strength is dominated by lightness (L), because chroma (C) approaches zero.

Therefore, the pigment efficiency for black inks can be defined as:

Pigment efficiency (-)=1/(Pigment concentration@lightness target (g pigment/g ink)=mass amount of ink (g)/mass amount of pigment@lightness target (g).

In principle, for a single color (CMYK) 100% coverage print (in the context of the present invention meaning an area of a single color printed with all nozzles of a print head in a single pass printing step), the L-value is desired to be as low as possible. Printed areas with higher lightness can be obtained by selecting a suitable print strategy or by dilution. Lower lightness areas are much harder to achieve or even impossible.

The above defined pigment efficiency enables comparison of different pigments and different ink compositions.

Because 60-80% of the cost price of an ink composition is determined by the used pigment (amounts), it is desirable to use the smallest amount, e.g. concentration (g pigment/g ink) of pigment possible and still meet the color strength target.

A disadvantage of ink compositions disclosed in the prior art that due to low pigment efficiency, a relatively high pigment load is required to obtain a desirable (target) color strength.

SUMMARY OF THE INVENTION

This object is at least partially obtained by providing an aqueous ink composition according to claim 1.

Inventors have found that the choice of pigment (type) is not related to pigment efficiency. The dominant factor for improving pigment efficiency is the choice of polymer particles (i.e. the latex) used in the ink composition.

Therefore, ink compositions according to the present invention comprise pigment particles originating from a pigment dispersion and a dispersion of polymer particles (also termed latex). The dispersion of polymer particles is selected such that the minimum film forming temperature of the dispersion of polymer particles is such that slow or no film formation occurs in a (heat) fixation step of the printing process. Further, the polymer particles have an average particle diameter that is larger than a threshold, for example larger than 50 nm.

Therefore, the invention relates to an aqueous ink composition for use in a printing method wherein the aqueous ink is printed onto a surface of a porous print substrate, the printing method comprising a fixation step at fixation conditions $T_{fix}$ and $t_{fix}$, wherein $T_{fix}$ is the fixation temperature and $t_{fix}$ is the exposure time of said print to $T_{fix}$, the aqueous ink composition being a mixture of a plurality of components comprising:

a pigment dispersion; and a dispersion of polymer particles, characterized in that the dispersion of polymer particles is selected such that its minimum film forming temperature (MFFT) is above a threshold $T_{threshold}$, wherein $T_{threshold} = T_{fix} - \Delta T$, wherein $\Delta T$ is selected such that if the MFFT of the dispersion of polymer particles is above $T_{threshold}$ no or slow film formation occurs under said fixation conditions, and wherein the polymer particles have a Z-average particle size, $d_{av}$ of at least 50 nm, preferably above 55 nm and more preferably above 60 nm.

In the context of the present invention, porous print substrates are substrates that are at least partly porous, such that liquids (e.g. ink) can penetrate into the print substrate. Examples of porous substrates are (but not limited to): plain papers and machine coated (MC) papers, also termed offset coated papers.

It is to be understood that the present invention relates to an optimization of ink characteristics in view of fixation process parameters. To obtain the desired effect of the present invention (which is improvement of color strength by preventing or at least slowing down film formation of an ink composition), the MFFT of the additive, i.e. a dispersion of polymer particles should be high enough to obtain at least slow (preferably no) film formation. The described threshold, $T_{threshold}$, must be experimentally determined and is dependent on at least desired fixation conditions (at least $T_{fix}$) and MFFT of the added dispersion of polymer particles. If the MFFT of the dispersion of polymer particles is above the fixation temperature, $T_{fix}$, film formation occurs. If the MFFT is slightly (i.e. $\Delta T$) below $T_{fix}$ slow film formation might occur. $\Delta T$ is dependent on the selected dispersion of polymer particles and needs to be experimentally determined by performing fixation experiments at different fixation temperatures (with the same ink composition) and determining the minimum fixation temperature at which the observed film formation is slow enough to obtain the desired effect of the present invention.

Inventors have surprisingly found that with such an ink composition, prints can be made with satisfactory color strength (for black expressed as the Lightness L-value of the CIELAB color system: the lower the L-value, the higher the color strength is) with inks having a relatively low pigment load. In other words, the pigment efficiency (expressed as indicated above) improves significantly.

In an embodiment, ΔT is between 0° C. and 25° C., preferably between 0° C. and 20° C., more preferably between 0° C. and 15° C.

In an embodiment, the Minimum Film Formation Temperature MFFT of the dispersion of polymer particles is slightly, i.e. between 0° C. and 15° C., preferably between 2° C. and 10° C. and more preferably between 5° C. and 8° C. below the fixation temperature $T_{fix}$, used in the heat fixation step of the printing process.

This embodiment results in slow film formation.

In an embodiment, the Minimum Film Formation Temperature MFFT of the dispersion of polymer particles is above the fixation temperature $T_{fix}$ This embodiment results in no film formation.

Therefore, the MFFT of the dispersion of polymer particles is between 0° C. and 15° C. below $T_{fix}$ or the MFFT is above $T_{fix}$ In an embodiment, the MFFT of the dispersion of polymer particles is above 50° C., preferably above 65° C. and more preferably above 70° C.

In an embodiment, the Z-average particle diameter of the polymer particles is at least 50 nm, preferably at least 60 nm, more preferably at least 80 nm.

In an embodiment, the dispersion of polymer particles is present in an effective amount of between 2 wt % and 20 wt %, preferably between 3 wt % and 18 wt %, more preferably between 5 wt % and 15 wt % with respect to the total ink composition and based on the solid content the polymer particles.

It is duly noted that the present invention can be applied to existing ink compositions by addition of the described film forming retardation additive to the ink compositions. Further the present invention can be used in designing new ink formulations.

Therefore, in another aspect the present invention relates to a method for improving the pigment efficiency in an ink composition comprising the steps of:
providing an ink composition;
providing fixation conditions $T_{fix}$ and $t_{fix}$, wherein $T_{fix}$ is the fixation temperature and $t_{fix}$ is the exposure time of said print to $T_{fix}$, wherein the fixation conditions are used for fixation of an image printed on a print substrate with the ink composition;
selecting a polymer dispersion wherein the polymer dispersion comprises polymer particles and has a minimum film forming temperature (MFFT) which is above a threshold $T_{threshold}$, wherein $T_{threshold} = T_{fix} - \Delta T$, wherein ΔT is selected such that if the MFFT of the dispersion of polymer particles is above $T_{threshold}$ no or slow film formation occurs under said fixation conditions, and wherein the polymer particles have a Z-average particle size, $d_{av}$ of at least 50 nm, preferably at least 55 nm and more preferably at least 60 nm;
adding the selected polymer dispersion to the ink composition in an effective amount.

In an embodiment, ΔT is between 0° C. and 25° C., preferably between 0° C. and 20° C., more preferably between 0° C. and 15° C.

In an embodiment the MFFT of the dispersion of polymer particles is between 0° C. and 15° C. below $T_{fix}$ or the MFFT of the dispersion of polymer particles is above $T_{fix}$ In an embodiment, the MFFT of the dispersion of polymer particles is above 50° C., preferably above 65° C. and more preferably above 70° C.

In an embodiment, the effective amount of the selected polymer dispersion is between 2 wt % and 20 wt %, preferably between 3 wt % and 18 wt %, more preferably between 5 wt % and 15 wt % with respect to the total ink composition and based on the solid content of the added selected polymer.

In an embodiment, the effective amount of the selected polymer dispersion is between 2 wt % and 8 wt % with respect to the total ink composition and based on the solid content of the added selected polymer.

By adding a so-called film-forming retardation additive, the pigment efficiency of existing ink compositions can hence be enhanced.

In yet another aspect, the present invention relates to a printing method comprising the steps of:
providing an ink composition according to the present invention or as obtained with a method according to the present invention;
providing a porous print substrate;
printing an image with the ink composition onto a surface of the porous print substrate;
fixation of the printed image obtained in the previous step at fixation conditions $T_{fix}$ and $t_{fix}$, wherein $T_{fix}$ is the fixation temperature and $t_{fix}$ is the exposure time of said print to $T_{fix}$.

In an embodiment, $T_{fix}$ is between 45° C. and 90° C., preferably between 50° C. and 80° C., more preferably between 55° C. and 70° C.

In an embodiment, $t_{fix}$ is between 0.5 s and 5 s, preferably between 1 s and 4 s and more preferably between 1.5 s and 3 s In an embodiment the printing method further comprises a step of post-fusing the image to the print substrate. In such a step heat is applied to a print substrate with an image fixated thereon (in accordance with the method disclosed above). Such a step is intended to improve the robustness of the print.

In an embodiment, the post-fusing step is performed in a closed heater, which is a heating device in which further evaporation of ink constituents can be prevented.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

DETAILED DESCRIPTION

In the art (fast) film formation is considered to be essential to obtain prints with good print quality and high print robustness. To obtain this, ink compositions have been designed such that at a selected and used fixation temperature film formation occurred. During development of new, advanced printing processes, in particular high-speed single pass printing with relatively low drying and fixation capacity new requirements for the ink compositions arose: due to lower drying and fixation capacity, the layer thickness of applied ink had to be reduced and as a consequence of that it was thought that pigment loads in the ink compositions should be increased in order to maintain the same amount of pigment per surface area unit in the prints. Therefore, pigment concentrations in ink compositions for use in thin layer printing processes were increased. As explained above, increasing the pigment concentration in ink compositions has a significant effect on the cost-price of such ink compositions. To a certain extent that is allowable, because less ink is needed for printing a good quality image when compared to more conventional ink jet printing methods (wherein thicker ink layers are printed). A further, aspect of desiring lower ink layer thickness is a significant improvement of print substrate deformation as a consequence of high amount of liquids printed thereon. The smaller the amounts of liquids to be printed are, the smaller the risk of print substrate deformation is.

Therefore, inventors were confronted with the desire to design ink compositions that could be used in 'thin layer' printing processes showing good print quality, taking into account that the cost-price of the ink compositions (i.e. pigment concentrations in the inks) remained acceptable.

Confronted with this desire, inventors defined the previously discussed pigment efficiency parameter and surprisingly found a way to increase the pigment efficiency in ink compositions according to the present invention.

The present invention has to aspects:
A) The selected dispersion of polymer particles has a minimum film forming temperature (MFFT) above a threshold below which film formation occurs. Therefore, the selection of the dispersion of polymer particles is dependent on the intended print process, in particular the intended fixation process: no (or slow) film formation should occur at the selected fixation conditions (fixation temperature and exposure time). In particular examples the MFFT of the dispersion of polymer particles is therefore selected to be above the fixation temperature;
B) The particle size distribution of the selected dispersion of polymer particles should be such that average particle diameter, $d_{av}$, is larger than a threshold, for example 50 nm. For the purpose of the present invention the Z-average particle size is used as determined with a zetasizer. There is a dependence on print substrate as well. For this aspect, over-dimensioning the particle size is a good option for making the ink composition suitable to be used on a wide range of different print substrates.

Not wanting to be bound to any theory, inventors believe that the effect of the present invention satisfies the following hypotheses:
A) Minimum Film Formation Temperature: at a fixation temperature above the MFFT of the dispersion of polymer particles, film formation will start, which is a fast process. Due to softening of the polymer particles two phenomena take place: leveling and shrinkage, both leading to a protrusion of pigment particles through the polymer film thus formed. The surface of the fixated print will have a micro-roughness (in the context of the present invention, micro-roughness relates to roughness of the ink layer itself, which is on a nanometer (nm) scale) that is higher than when no or less protrusion of pigment particles occurs. Rougher surfaces will lead to lower color strength (higher Lightness) and thus to lower pigment efficiency, when compared to smoother surfaces
B) Particle Size: The correlation of color strength of the print and particle size (distribution) of the dispersion of polymer particles is dependent on the macrostructure of the print substrate (a.o. porosity and roughness). If the pore size of the used print substrate is larger, the polymer particles will penetrate deeper into the print substrate during fixation. This causes a resin (polymer) depletion effect on the surface of the printed print substrate, which causes the pigment to be exposed (protrude). The film thickness is reduced, which negatively influences the macro-roughness of the printed surface. In the context of the present invention the macro-roughness relates to the roughness of the print substrate and initially determines gloss level of the print substrate: glossy print substrates have low macro-roughness, uncoated (matt) print substrates have high macro-roughness. With thick ink layers, the macro-roughness can be decreased and gloss can be obtained even of high macro-roughness print substrates. By decreasing the ink layer thickness, the ink layer more or less follows the structure of the print substrate, without changing the macro-roughness. Hence the macro-roughness cannot be influenced anymore with thin ink layers. As a consequence gloss level cannot be controlled anymore, or at the least becomes more difficult.

These effects combined lead to loss of color strength and hence decreased pigment efficiency.

The invention presented in the present disclosure can be implemented in various ways. First of all, a non-film forming (or slow film forming) polymer dispersion can be added to existing ink composition (film forming prevention additive) or new ink compositions can be designed that contain a non-film forming (or slow film forming) polymer dispersion.

Ink Composition

An ink composition according to the present invention comprises a pigment dispersion, a dispersion of polymer particles (latex), water as a solvent and optionally additives such as one or more cosolvents, one or more surfactants and other additives. The components of the inks will be described in detail in the next sections.

Pigment Dispersion

The pigment is not particularly limited and may be suitably selected in accordance with the intended use.

Examples of the pigment usable in the present invention include those commonly known without any limitation. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

The amount of pigment contained in the inkjet ink, as a solid content with reference to the total ink composition, is preferably 0.5 weight % to 15 weight %, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink is increased, causing degradation in ink ejection stability.

Solvent

Water is cited as an environmentally friendly and hence desirable solvent. In the present invention, the content of water to the whole ink is preferably from 20 weight % to 80 weight %. It is more preferable that the content of water is from 30 weight % to 75 weight %, even more preferable from 40 weight % to 70 weight %.

Cosolvent

As a solvent of the ink, for the purposes of improving the ejection property of the ink or adjusting the ink physical properties, the ink preferably contains a water soluble organic solvent in addition to water. As long as the effect of the present invention is not damaged, there is no restriction in particular in the type of the water soluble organic solvent.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Examples of the amides include formamide (bp 210° C.), N-methylformamide (bp 199° C.-201° C.), N,N-dimethylformamide (bp 153° C.), and N,N-diethylformamide (bp 176° C.-177° C.).

Examples of the amines include monoethanolamine (bp 170° C.), dimethanolamine (bp 268° C.), triethanolamine (bp 360° C.), N,N-dimethylmonoethanolamine (bp 139° C.), N-methyldiethanolamine (bp 243° C.), N-methylethanolamine (bp 159° C.), N-phenylethanolamine (bp 282° C.-287° C.), 3-aminopropyl diethylamine (bp 169° C.), N-ethyldiethanolamine, N,N-diethylmonoethanolamine, tripropanolamine, 2-amino-2-methyl-1-propanol, N-ethyl-monoethanolamine, N,N-di-n-butylmonoethanolamine, diisopropanolamine, N-n-butylmonoethanolamine, N-n-butyldiethanolamine and diglycolamine.

Examples of the sulfur-containing compounds include dimethylsulfoxide (bp 139° C.), sulfolane (bp 285° C.), and thiodiglycol (bp 282° C.). As other solid water-soluble organic solvents, saccharides are preferable. Examples of the saccharides include monosaccharides, disaccharides, oligosaccharides (including triaccharides and tetrasaccharide), and polysaccharides.

Specific examples thereof include glucose, mannose, fructose, ribose, xylose, arabinose, galactose, maltose, cellobiose, lactose, sucrose, trehalose, and maltotriose. Here, the above-mentioned polysaccharides mean broad sense-saccharides, which may include substances existing widely in nature, such as orcyclodextrin and cellulose. Derivatives of these saccharides include reducing sugars of saccharides (for example, sugar alcohol, which is expressed by the general formula: $HOCH_2(CHOH)_nCH_2OH$, wherein n is an integer of 2 to 5), oxidized sugars (for example, aldonic acids and uronic acids), amino acids, and thio acids. Among these, sugar alcohol is preferable. Specific examples of sugar alcohol include maltitol and sorbitol.

In an embodiment, a mixture of the water-soluble organic solvents may be comprised in an ink composition according to the present invention. The individual organic solvents preferably being present in an amount of 1 weight % to 50 weight %, more preferably in an amount of 1 weight % to 40 weight %, even more preferably in an amount of 1 weight % to 25 weight %, relative to the total ink composition.

The total amount of the water-soluble organic solvent contained in the ink composition is not particularly limited. It is, however, preferably 0 weight % to 75 weight %, and more preferably 10 weight % to 70 weight %, and even more preferably 15 weight % to 60 weight % with respect to the total ink composition. When the amount of the water-soluble organic solvent is more than 80 weight %, the drying times of the ink compositions are too long. When the amount is less than 10 weight %, water in the ink compositions may evaporate more quickly, which may significantly reduce the stability of the ink composition.

In an embodiment, an amino alcohol, in particular a N-alkyl-dialkanolamine, is used as a cosolvent in a small amount, i.e. less than 3 weight %, preferably less than 2 weight %, more preferably around 0.5 weight % with respect to the total ink composition. In such an ink formulation, the total fraction of stabilizing cosolvents can be significantly reduced (e.g. from 40 weight % to between 20 weight % and 30 weight %) without compromising the ink stability (in the inkjet head) and spreading properties on a receiving medium. An ink composition according to the present embodiment preferably comprises a total amount of cosolvents of between 0 weight % and 40 weight %, preferably between 10 weight % and 35 weight %, more preferably between 20 weight % and 30 weight %. Examples of suitable amino alcohols are: triethanolamine, N-metyldiethanolamine, N-ethyldiethanolamine, N-n-butyl-monoethanolamine and N-n-butyl-diethanolamine.

Surfactants

It is preferable that the ink of the present invention contains a surfactant in order to improve an ink ejection property and/or the wettability of the surface of a recording medium, and the image density and color saturation of the image formed and reducing white spots therein. To improve the spreading of the ink on the surface of recording medium and to reduce puddling, it is preferable to adjust the dynamic surface tension (measured at 10 Hz) of the ink composition to 35 mN/m or lower, preferably to 34 nN/m or lower, more preferably to 33 mN/m or lower, even more preferably to 32 mN/m or lower by the surfactant. The static surface tension of the ink composition is preferably below 30 mN/m (measured at 0.1 Hz).

Examples of surfactants are not specifically limited. The following can be cited.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants capable of reducing the surface tension to 30 mN/m or lower is preferably used.

Examples of a cationic surfactant include: aliphatic amine salts, aliphatic quarternary ammonium salts, benzalkonium salts, benzethonium chloride, pyridinium salts, imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbezenesulfonic acid salt, an alkylnaphthalenesulfonic acid salt, a dialkylsulfo succinate (e.g. sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt.

Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an acetyleneglycol, an ethoxylated acetylene glycol, acetylene alcohol.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5-decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

It is preferable that a part of these surfactants is furthermore substituted with a silicon atom from a viewpoint of reducing the surface tension.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use.

As the polyether-modified silicone surfactant, commercial products may be used. Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic).

All surfactants mentioned in this section may be used solely, or they may be used in combination of the plural.

The total amount of the surfactant contained in the inkjet ink is preferably 0.01 weight % to 3.0 weight %, and more preferably 0.5 weight % to 2 weight %, with respect to the total ink composition. When the amount of the surfactant is less than 0.01 weight %, the effect of adding the surfactant may be substantially reduced or even insignificant. When it is more than 3.0 weight %, the permeability to recording media may be higher than necessary, possibly causing a degradation of image density and occurrence of ink-strike-through.

Dispersion of Polymer Particles (Latex)

Suitable film-forming-retarding dispersions of polymer particles are (but not limited to) listed in Table 2 as examples 1-10. In the context of the present invention such film-forming-retarding dispersion of polymer particles may be added to an ink composition that already comprises a latex, i.e. dispersion of polymer particles. Such latex composition is not limited to any kind and use of latex in an ink composition and latex ink compositions are known in the art.

Other Additives

Ink compositions according to the present invention may contain other additives such as, (dispersed) waxes, (polymeric) thickeners (viscosity modifiers), anti-microbial agents, dispersion stabilizers, UV-stabilizers, etcetera.

EXAMPLES

Materials
Ink Components:
Surfactants Surfynol 440 and, Dynol 800 were obtained from Evonik.
Wax dispersion Michem Lube 160 was obtained from Michelman
Pigment dispersions Cabojet 400 Black and Cabojet IJX 809 were obtained from Cabot
Properties of the used latices including supplier are shown in Table 2.
Setaqua 6777, Tg=94° C., MFFT=120° C. and $Z_{AV}$=297 nm, obtained from Allnex
All other chemicals (e.g. Betaine (98%), Glycerol reagent plus (99%), 1,2-hexanediol (98%)) used in the examples were obtained from Sigma Aldrich, unless stated otherwise.
All chemicals were used as received, unless stated otherwise.
Print Substrates:
Canon Red Label Superior (Canon Production Printing)
Magno Matt obtained from Sappi Global
Methods
Determination of Minimum Film Formation Temperature (MFFT)
For the purpose of the present invention the MFFT specified by the supplier is verified by measurement. For measurement of the MFFT a Rhopoint instruments MFFT-90 apparatus is used.
Particle Size Distribution (PSD)
For the purpose of the present invention the Z-average particle diameter is determined by measurement using a Zetasizer nano-series nano-ZS of Malvern.
Lightness (L*)
The lightness of printed matter was determined by measurement using a X-rite exact 1.5 mm S/N of Pantone. It is an automated measurement.
Rod Coating
Rod coating samples were prepared in accordance with the method below:
1) Print substrate was fixed on clipboard;
2) Print substrate was coated with ink composition by drawing a 10μ Mayer bar;
3) The coated print substrate was fused on a hot plate fuser for 3 s @ 65° C.

Comparative Example (CE) 1: Preparation of Ink Composition

An aqueous ink composition was prepared at ambient conditions by adding water, betaine and glycerol to a 500 ml. glass flask and stirring the mixture for 60 minutes to ensure good dissolving of the betaine. After a clear solution was obtained, 1,2-hexanediol and Surfinol 440 were added and again the mixture was stirred for 5 minutes to ensure homogenization of the surfactant. Following this, the polymer dispersion (latex), Eastek 1000 (see Table 2), the Cabojet 400 black pigment dispersion (Table 1) and ML160 wax dispersion (Table 1) were added one by one, with stirring in between to homogenize the dispersions. After this the resulting ink composition was stirred for one hour. The amounts of components were selected such that an ink composition as shown in Table 1 was obtained. Note that the concentrations of latex, pigment and wax are related to the solids content in the total ink composition. How to calculate the needed amounts of dispersion and amount of rest water that needs to be added is known to those skilled in the art.

TABLE 1

Ink composition prepared in Comparative Example 1

| Component | | amount (wt %) |
|---|---|---|
| Cosolvent mixture | Betaine/Glycerol | 16 |
| Surfactant mixture | 1,2-hexanediol/Surfynol 440 | 2 |
| Latex | Neorez R9621 | 8 |
| Pigment | Cabojet 400 | 5.8 |
| Wax | ML160 | 2 |
| Water | | 66.2 |
| Total | | 100 |

Comparative Examples (CE) 2-25 and Examples 1-10: Preparation of Ink Compositions Example 1 was repeated by substituting the dispersion of polymer particles with the respective dispersions disclosed in Table 2.

The concentrations of the components in the ink compositions prepared in the respective examples were the same as in Example 1 and shown in Table 1.

Printing Examples

Prints were made with the inks of Comparative Examples 1-25 and Examples 1-10 on print substrate Canon Red Label Superior. This print substrate has a high porosity and is therefore highly sensitive towards the particle size (distribution) of the used dispersion of polymer particles.

Prints were made with print head Kyocera 1200 dpi with ink coverage of 7-8 g/m$^2$ on an area of approximately 2.5 cm*2.5 cm.

The printed images were fixated at a temperature of 65° C. for 3 seconds.

The L*-value was determined in accordance with above described method. The target L* values were determined per print substrate in accordance with EPG (Electrophotography) standards and was 18 for Canon Red Label Superior (in short Red Label) and 11.2 for Magno Matt.

Figure 1:
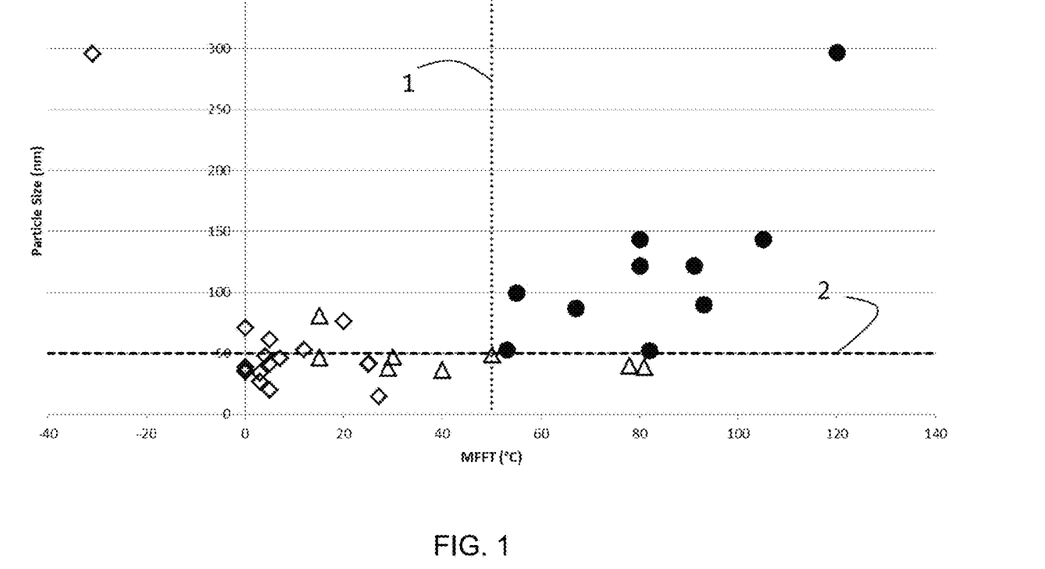
FIG. 1 Shows a graph of the particles sized of the polymer particles as a function of the MFFT of the particle dispersions. The data sets indicate ranges of L*-values for printing on a) Canon Red Label Superior and b) Magno Matt FIG. 2 Shows a graph with the results of rod coat experiments on Canon Red Label Superior: The L*-value as a function of ratio Eastek 1200/S6777 polymer particle dispersions FIG. 3 Shows a graph with the results of rod coat experiments on Canon Red Label Superior: The L*-value as a function of ratio Eastek 1200/S6777 polymer particle dispersions.

FIG. 1 shows a graphical representation of the printing examples on print substrate Canon Red Label Superior. The particle size of the polymer particle dispersions (vertical axis, y-axis) is shown as a function of Minimum Film Formation Temperature (horizontal axis, x-axis). The L*-value that is determined in accordance with the above described method is represented as different data sets: the white diamonds represent all polymer dispersions resulting in prints having a L*-value larger than 22; the white triangles represent all polymer dispersions resulting in prints having a L*-value of between 18 and 22; and the black circles represent all polymer dispersions resulting in prints having a L*-value of 18 or below. For these particular examples, e.g. printed on Canon Red Label Superior, the target L*-value (color target) is 18 The lowest MFFT for meeting the color target is 50° C., as indicated with (vertical) dotted line 1. The lowest particle size is 50 nm, as indicated with (horizontal) intermitted line 2. Therefore, based on these results, the targeted MFFT of the dispersion of polymer particles is 50° C. or higher and the targeted average particle size of the used polymer particles is 50 nm or larger.

TABLE 2 dispersion of polymer particles (*latex) used in ink compositions according to Comparative Examples CE1-CE-25 and Examples 1-10

| | Latex* | Supplier | MFFT (° C.) | Particle Size (nm) | L*-value Red Label | Magno Matt |
|---|---|---|---|---|---|---|
| CE 1 | Eastek 1000 | Eastman | 3 | 27.0 | 28.0 | 20.5 |
| CE 2 | Eastek 1300 | Eastman | 12 | 53.0 | 28.0 | 25.0 |
| CE 3 | Eastek 1200 | Eastman | 27 | 15.0 | 28.0 | 18.0 |
| CE 4 | Eastek 1400 | Eastman | 3 | 34.0 | 27.9 | 23.7 |
| CE 5 | Eastek 1100 | Eastman | 5 | 20.0 | 27.8 | 23.3 |
| CE 6 | Neorez R9340 | DSM | 0 | 71.1 | 26.7 | 22.8 |
| CE 7 | Neorez R600 | DSM | 0 | 36.3 | 26.1 | 19.0 |
| CE 8 | Carboset GA1594 | DSM | 5 | 41.1 | 25.9 | 21.3 |
| CE 9 | Neorez R9621 | DSM | −31 | 296.0 | 24.7 | 26.3 |
| CE 10 | NeoCryl A1127 | DSM | 7 | 46.0 | 24.4 | 14.2 |
| CE 11 | Alb. AS 2685 | Alberdingk-Boley | 20 | 76.5 | 24.3 | 15.8 |
| CE 12 | Neorez R610 | DSM | 0 | 39.1 | 24.2 | 18.4 |
| CE 13 | Alb U9350 VP | Alberdingk-Boley | 0 | 34.6 | 23.8 | 23.6 |
| CE 14 | U9380 VP | DSM | 25 | 41.0 | 23.4 | 16.1 |
| CE 15 | Plascoat Z867 | Goo chemicals | 25 | 41.8 | 22.6 | 17.9 |
| CE 16 | Worléecryl 7177 | Worlée | 5 | 61.4 | 22.3 | 13.9 |
| CE 17 | Neopac E123 | DSM | 4 | 48.0 | 22.1 | 15.8 |
| CE 18 | U9800 | DSM | 40 | 36.5 | 22.0 | 11.8 |
| CE 19 | APU 10610 | Alberdingk-Boley | 15 | 46.8 | 21.4 | 16.8 |
| CE 20 | Neorez 2190 | DSM | 15 | 81.5 | 20.9 | 14.2 |
| CE 21 | R4000 | DSM | 78 | 40.0 | 20.3 | 14.5 |

TABLE 2-continued dispersion of polymer particles (*latex) used in ink compositions according to Comparative Examples CE1-CE-25 and Examples 1-10

| | Latex* | Supplier | MFFT (° C.) | Particle Size (nm) | L*-value Red Label | Magno Matt |
|---|---|---|---|---|---|---|
| CE 22 | Neorez 2170 | DSM | 50 | 49.1 | 20.3 | 11.5 |
| CE 23 | Neorez 2180 | DSM | 30 | 46.9 | 20.2 | 16.8 |
| CE 24 | Neorez R620 | DSM | 29 | 38.2 | 19.6 | 11.8 |
| CE 25 | Neorez 2202 | DSM | 81 | 39.0 | 18.2 | 11.7 |
| 1 | XK 205 | DSM | 55 | 100.0 | 18.0 | 11.2 |
| 2 | Neopac 9036 | DSM | 53 | 53.2 | 17.8 | 10.9 |
| 3 | Neorez A1131 | DSM | 82 | 52.7 | 17.7 | 10.8 |
| 4 | Carboset 3119 | DSM | 91 | 122.3 | 17.6 | 10.7 |
| 5 | Hycar 26459 | Lubrizol | 105 | 143.9 | 17.6 | 10.7 |
| 6 | Neocryl A639 | DSM | 67 | 87.5 | 16.5 | 11.1 |
| 7 | Neocryl A1105 | DSM | 93 | 90.6 | 16.5 | 10.5 |
| 8 | Syntran 3214 | Zschimmer and Schwarz | 80 | 122.3 | 16.5 | 9.9 |
| 9 | Setaqua 6777 | Polychem | 120 | 297.0 | 16.5 | 9.8 |
| 10 | Syntran 3211 | Zschimmer and Schwarz | 80 | 143.9 | 16.2 | 9.6 |

FIG. 1 also represents the results of the printing examples on print substrate Magno Matt. The L*-value that is determined in accordance with the above described method is represented as different data sets (in this example for print substrate Magno Matt): the white diamonds represent all polymer dispersions resulting in prints having a L*-value larger than 15; the white triangles represent all polymer dispersions resulting in prints having a L*-value of between 11.2 and 15; and the black circles represent all polymer dispersions resulting in prints having a L*-value of 11.2 or below.

For these particular examples, e.g. printed on Magno Matt, the target L*-value (color target) is 11.2 The lowest MFFT for meeting the color target is 50° C., as indicated with (vertical) dotted line 1. The lowest particle size is 50 nm, as indicated with (horizontal) intermitted line 2. Therefore, based on these results, the targeted MFFT of the dispersion of polymer particles is 50° C. or higher and the targeted average particle size of the used polymer particles is 50 nm or larger.

In the context of the present invention it is stated that no or slow film formation may occur. If the MFFT is above $T_{fix}$ (virtually) no film formation occurs. If the MFFT is (slightly, i.e. 15° C. or less) below $T_{fix}$, the intended effect of the present invention (increasing pigment efficiency) is still obtained.

Comparative Example (CE) 26: Preparation of Ink Composition in Accordance with the Prior Art An aqueous ink composition was prepared at ambient conditions by mixing water, the cosolvents and surfactants shown in Table 3 and stirring the mixture for 5 minutes. Then the polymer dispersion (latex), Eastek 1200 (see Table 2), the Cabojet IJX 809 black pigment dispersion (Table 1) and ML160 wax dispersion (Table 3) were added. The ink mixture was then stirred for at least 1 hour. The amounts of components were selected such that an ink composition as shown in Table 3 was obtained. Note that the concentrations of the latex, pigment and wax related to the solids content in the total ink composition.

TABLE 3

Ink composition prepared in Comparative Example (CE) 26

| Component | | amount (wt %) |
|---|---|---|
| Cosolvent mixture | Betaine/Glycerol | 16 |
| Surfactant mixture | 1,2-hexanediol/Dynol 800 | 2 |
| Latex | Eastek 1200 | 10 |
| Pigment | Cabojet IJX 809 | 5.8 |
| Wax | ML160 | 1 |
| Water | | 65.2 |
| Total | | 100 |

Examples 11-14: Preparation of Ink Compositions in Accordance with the Present Invention Substituting Dispersion of Polymer Particles by Mixture of Dispersions of Polymer Particles One of which is Non-Film Forming Comparative Example (CE) 26 was repeated with the difference that the dispersion of polymer particles Eastek 1200 was replaced by a mixture of Eastek 1200 and Setaqua 6777 (amounts of Eastek 1200 of 75 wt %, 50 wt %, 25 wt % and 0 wt % with respect to total amount of polymer particles, respectively). The total amount of resin particles was kept constant at 10 wt %.

Rod Coat Experiments

The ink compositions of Comparative Example 26 and Examples 11-14 were rod coated on Red Label and Magno Matt as described in the methods section of this application. The obtained rod coated samples were fixated at 65° C. for 3 s.

Figure 2:
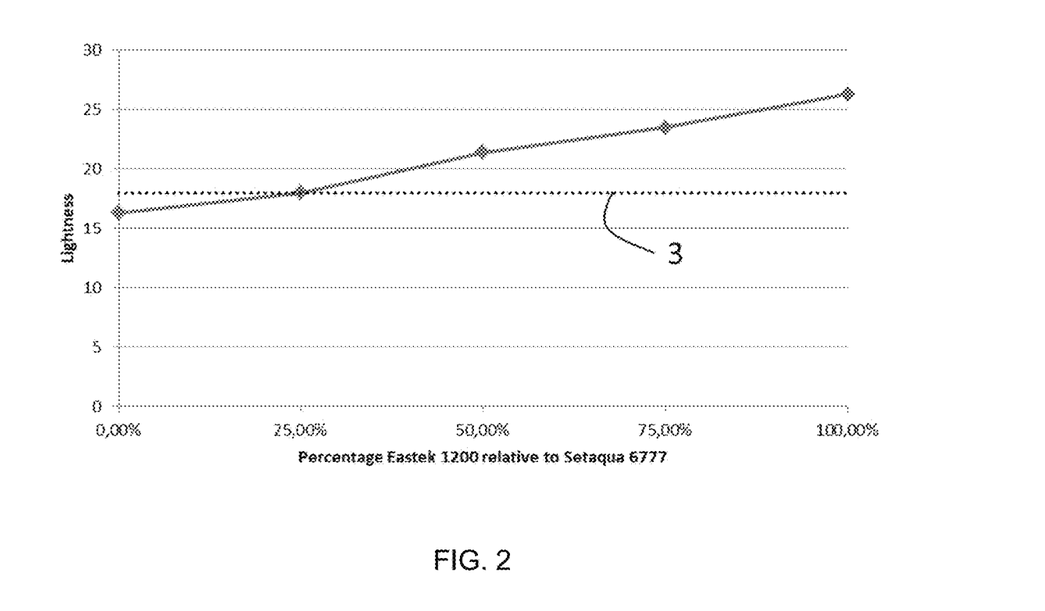
Figure 3:
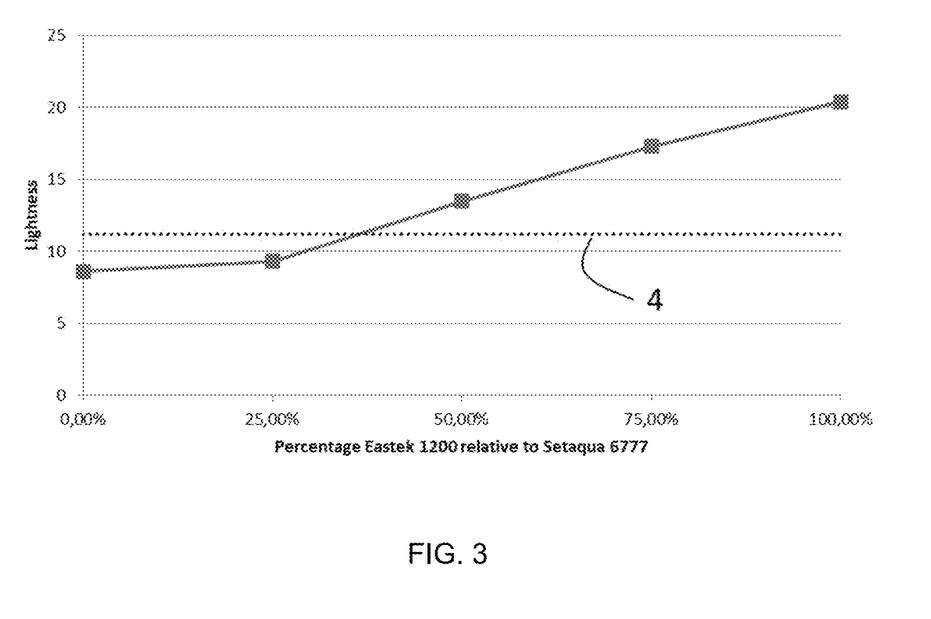

The results are shown in FIGS. 2 and 3. Both FIGS. 2 and 3 show that for both rod coat samples made on Canon Red Label Superior and Magno Matt, the L*-value decreases with increasing amount of film-forming-retarding additive (i.e. Setaqua 6777). The effect is most profound for Magno Matt, FIG. 3 (coated media in general). FIG. 2 shows that for a mixture of 25 wt % Eastek 1200 and 75 wt % Setaqua 6777, the color target of 18 (horizontal dotted line 3) is met. FIG. 3 shows that for a mixture of approximately 36 wt % Eastek 1200 and 64 wt % Setaqua 6777, the color target of 11.2 horizontal dotted line 4) is met. Therefore, by adding a non-film forming or slow film forming additive to an existing ink, the pigment efficiency can be improved.

The invention claimed is:

1. An aqueous ink composition for use in a printing method, wherein the aqueous ink is printed onto a surface of a porous print substrate, the printing method comprising a fixation step at fixation conditions $T_{fix}$ and $t_{fix}$, wherein $T_{fix}$ is the fixation temperature and $t_{fix}$ is the exposure time of said print to $T_{fix}$, the aqueous ink composition being a mixture of a plurality of components comprising:
 a pigment dispersion; and
 a dispersion of polymer particles, wherein the dispersion of polymer particles is selected such that its minimum film forming temperature (MFFT) is above a threshold $T_{threshold}$, wherein $T_{threshold} = T_{fix} - \Delta T$, wherein $\Delta T$ is selected such that if the MFFT of the dispersion of polymer particles is above $T_{threshold}$ no or slow film formation occurs under said fixation conditions, and wherein the polymer particles have a Z-average particle size, day of at least 50 nm.

2. The aqueous ink composition according to claim 1, wherein $\Delta T$ is between 0° C. and 25° C.

3. The aqueous ink composition according to claim 1, wherein the MFFT of the dispersion of polymer particles is between 0° C. and 15° C. below $T_{fix}$ or the MFFT of the dispersion of polymer particles is above $T_{fix}$.

4. The aqueous ink composition according to claim 1, wherein the MFFT of the dispersion of polymer particles is above 50° C.

5. The aqueous ink composition according to claim 1, wherein the dispersion of polymer particles is present in an effective amount of between 2 wt % and 20 wt %, with respect to the total ink composition and based on the solid content of the polymer particles.

6. A method for improving the pigment efficiency in an ink composition comprising the steps of:
 providing an ink composition;
 providing fixation conditions $T_{fix}$ and $t_{fix}$, wherein $T_{fix}$ is the fixation temperature and $t_{fix}$ is the exposure time of said print to $T_{fix}$, wherein the fixation conditions are used for fixation of an image printed on a print substrate with the ink composition;
 selecting a polymer dispersion wherein the polymer dispersion comprises polymer particles and has a minimum film forming temperature (MFFT) which is above a threshold $T_{threshold}$, wherein $T_{threshold} = T_{fix} - \Delta T$, wherein $\Delta T$ is selected such that if the MFFT of the dispersion of polymer particles is above $T_{threshold}$ no or slow film formation occurs under said fixation conditions, and wherein the polymer particles have a Z-average particle size, day of at least 50 nm; and
 adding the selected polymer dispersion to the ink composition in an effective amount.

7. The method according to claim 6, wherein $\Delta T$ is between 0° C. and 25° C.

8. The method according to claim 6, wherein the MFFT of the dispersion of polymer particles is between 0° C. and 15° C. below $T_{fix}$ or the MFFT of the dispersion of polymer particles is above $T_{fix}$.

9. The method according to claim 6, wherein the MFFT of the dispersion of polymer particles is above 50° C.

10. The method according to claim 6, wherein the effective amount of the selected polymer dispersion is between 2 wt % and 20 wt %, with respect to the total ink composition and based on the solid content of the added selected polymer.

11. A method of printing comprising the steps of:
 providing the ink composition according to claim 1;
 providing a porous print substrate;
 printing an image with the ink composition onto a surface of the porous print substrate; and
 fixation of the printed image obtained in the previous step at fixation conditions $T_{fix}$ and $t_{fix}$, wherein $T_{fix}$ is the fixation temperature and $t_{fix}$ is the exposure time of said print to $T_{fix}$.

12. The method according to claim 11, wherein the method further comprises a step of post-fusing the image to the print substrate.

13. The method according to claim 12, wherein the post-fusing step is performed in a closed heater, which is a heating device in which further evaporation of ink constituents can be prevented.

14. A method of printing comprising the steps of:
 providing the ink composition obtained by the method according to claim 6;
 providing a porous print substrate;
 printing an image with the ink composition onto a surface of the porous print substrate; and
 fixation of the printed image obtained in the previous step at fixation conditions $T_{fix}$ and $t_{fix}$, wherein $T_{fix}$ is the fixation temperature and $t_{fix}$ is the exposure time of said print to $T_{fix}$.

* * * * *